United States Patent Office 3,826,669
Patented July 30, 1974

3,826,669
COMPOSITIONS CONTAINING A REACTIVE HYDROXYL - CONTAINING VINYL CHLORIDE POLYMER AND A LIQUID POLYEPOXIDE
George J. Antlfinger, Avon Lake, and Harold E. Von Kamp, Elyria, Ohio, assignors to The B. F. Goodrich Company, New York, N.Y.
No Drawing. Filed Dec. 8, 1972, Ser. No. 313,602
Int. Cl. C08f 15/26, 37/18
U.S. Cl. 106—287 R
10 Claims

ABSTRACT OF THE DISCLOSURE

Solvent resistant films are obtained from compositions containing vinyl chloride, vinylidene chloride, and a hydroxyl-containing monomer copolymerizable therewith, and a liquid polyepoxide, along with small amounts of chromium diisopropyl salicylate and stannic chloride as catalysts.

BACKGROUND OF THE INVENTION

It is well known that copolymers containing vinyl chloride, vinyl acetate and vinyl alcohol are useful materials in forming coating compositions for wood, metal and glass. These copolymers, after being treated to hydrolysis conditions to partially hydrolyze the acetate portion of the copolymer, when compounded with thermosetting resins, have found utility in coating metal whereby strong flexible chemically resistant films are formed. However, the hydrolysis step is expensive and time consuming. It was found that the hydrolysis step could be eliminated by copolymerizing vinyl chloride and vinylidene chloride or vinyl acetate with certain hydroxyl-containing monomers, for example, hydroxypropyl acrylate. These copolymers were found to have reactivity with urea formaldehyde resins, melamine resins and isocyanate resins and produce solvent resistant films, as is described in copending application Ser. No. 313,603, filed Dec. 8, 1872.

It is known that the epoxy resins are very useful in the production of hard, solvent resistant films. Unfortunately, the hydroxyl-containing copolymers, defined in the above-identified application, did not exhibit reactivity with epoxy resins when compounded therewith. Accordingly, it was readily recognized that obtaining reactivity between said hydroxyl-containing copolymers and epoxy resins would be most desirable.

SUMMARY OF THE INVENTION

It was unexpectedly found that hydroxyl-containing copolymers of vinyl chloride, vinylidene chloride or vinyl acetate, and hydroxypropyl acrylate or hydroxypropyl methacrylate exhibit reactivity with epoxy resins when there is added to the mixtures of said copolymers and epoxy resins a small amount of chromium diisopropyl salicylate and stannic chloride. When such compositions are heated in film form, or as a coating on a substrate, such as metal, for example, reactivity between the copolymer and epoxy resin occurs.

DETAILED DESCRIPTION

The hydroxyl-containing copolymers used in composition of the present invention are preferably prepared by the use of the aqueous suspension polymerization technique. However, the copolymers may also be made using emulsion and solution polymerization systems. In fact, when vinyl acetate is employed as one of the comonomers, it is preferred to use solution polymerization in an organic solvent, such as acetone, methyl ethyl ketone, and the like.

In making the hydroxyl-containing copolymers, from about 40% to about 90% by weight of vinyl chloride, from about 10% to about 60% by weight of vinylidene chloride or vinyl acetate, and from about 2% to about 20% by weight of hydroxypropyl acrylate or hydroxypropyl methacrylate are charged to the polymerization reaction vessel along with the reaction medium. A free-radical generating catalyst and the polymerization reaction started and continued at a temperature in the range of 40° C. to about 70° C. until complete or until the desired percentage conversion is obtained. It has also been found that the reactivity of the hydroxyl-containing copolymers with epoxy resins can be further enhanced when from about 6 to about 10 parts by weight, based on the total weight of the monomers, of a highly polar monomer is incorporated therein during the polymerization. Suitable polar monomers, for use in the present invention, are the alkyl esters of acrylic and methacrylic acids wherein the alkyl group contains from 1 to 4 carbon atoms. Examples of such polar monomers are methyl acrylate, ethyl acrylate, n-butyl acrylate, methyl methacrylate, ethyl methacrylate, butyl methacrylate, etc. Particularly effective monomers are methyl methacrylate and n-butyl acrylate. More than one polar monomer may be employed in the copolymerization.

When employing a suspension polymerization system, the liquid reaction medium or media are generically called aqueous reaction media which comprise water alone or intimate admixtures of water with one or more organic solvents, such as the alcohols including methyl, ethyl, propyl, butyl, amyl, hexyl, heptyl, octyl, methyl hexyl, dimethyl hexyl, and other alcohols, including the polyhydric alcohols, such as glycol, glycerol, and the like, an alkyl nitirle, such as acetonitrile, ethylene cyanohydrin, and the like; the ethers, such as methyl, ethyl, propyl, butyl, and higher ethers, and the like; the ketones such as acetone, methyl ethyl ketone, cyclohexanone, and the like.

It is advantageous, although not essential, to add to the liquid reaction media a small amount of a dispersant in order to obtain a more complete and uniform dispersal of the monomers and catalyst throughout the reaction media prior to and during the polymerization of the monomers. Any of the well known dispersants operative in aqueous media may be employed. These include, among others, methyl cellulose, polyvinyl alcohol, dodecylamine hydrochloride, sodium lauryl sulfonate, sodium lauryl sufate, lauryl alcohol, sorbitan monolaurate polyoxyethylene, nonylphenoxy polyoxyethylene ethanol, hydrolyzed polyvinyl acetate, etc.

A free-radical producing catalyst is employed in making the hydroxyl-containing copolymers for use in the compositions of the present invention. Suitable catalysts include, by way of example, lauryl peroxide, caprylyl peroxide, cyclohexane sulfonyl peroxide, acetyl cyclohexyl sulfonyl peroxide, acetyl sec-heptyl sulfonyl peroxide, hydrogen peroxide, methyl hydroperoxide, ethyl hydroperoxide, propyl hydroperoxide, butyl hydroperoxide, or other alkyl hydroperoxides, cumene hydroperoxide, isopropyl percarbonate, sec-butyl peroxydicarbonate, isobutyl peroxydicarbonate, potassium persulfate, and the like. The amount of the catalyst used is normally kept as low as possible consistent with a good polymerization rate. The catalyst chosen may also be used in combination with one or more other catalysts. The amount of catalyst employed will depend upon the particular catalyst or catalysts chosen and the temperature of the polymerization reaction. Usually an amount of catalyst in the range of 0.001 weight part to about 1.0 weight part based on 100 weight parts of monomers is sufficient.

The epoxy resins which are useful in preparing the compositions of the present invention are the polyepoxides having a plurality of

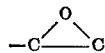

that is, vicinal epoxy groups. They may be saturated or unsaturated, aliphatic, cycloaliphatic, aromatic or heterocyclic and may be substituted, if desired, with non-interfering substituents, such as chlorine atoms, hydroxyl groups, ether radicals, and the like.

Particularly useful in the present compositions are the polymeric type of polyepoxides. For example, the polyepoxy polyhydroxy polyethers obtained by reacting, preferably in an alkaline or an acid medium, a polyhydric alcohol or a polyhydride phenol with a polyepoxide such as the reaction product of glycerol and bis (2,3-epoxy propyl) ether, the reaction product of sorbitol and bis (2,3-epoxy-2-methyl propyl) ether, the reaction product of pentaerythritol and 1,2-epoxy-4,4-epoxy-pentane, and the reaction product of bis-phenol and bis (2,3-epoxy-2-methyl propyl) ether, the reaction product of resorcinol and bis (2,3-epoxy propyl) ether, and the reaction product of catechol and bis (2,3-epoxy propyl) ether.

A further useful group of the polymeric polyepoxides comprises the hydroxy-substituted polyepoxy polyethers obtained by reacting, preferably in an alkaline medium, a slight excess, for example, 0.5 to 3 mol excess, of a halogen-containing epoxide, as described above, with any of the above-described polyhydric phenols, such as resorcinol, catechol, bis-phenol, bis (2,2'-dihydroxy-dinaphthyl) methane, and the like. Also included with in this group are the polyepoxy polyethers obtained by reacting, preferably in the presence of an acid-acting compound, such as hydrofluoric acid, one of the aforementioned halogen-containing epoxides with a polyhydric alcohol, such as glycerol, propylene glycol, ethylene glycol, trimethylene glycol, butylene glycol, and the like, and subsequently treating the resulting product with an alkaline component.

Other useful polyepoxide materials include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo additional polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and the like. Examples of these polymers are poly-(allyl 2,3-epoxypropyl ether), poly (2,3-epoxypropyl crotonate), allyl-2,3-epoxypropyl ether-styrene copolymer, poly (vinyl 2,3-epoxypropyl ether), allyl glycidyl ether-vinyl acetate copolymer, and poly (4-glycidyloxystyrene).

Particularly useful in the compositions of the present invention are the low molecular weight, liquid glycidyl polyethers of dihydric phenols obtained by reacting epichlorohydrin with a dihydric phenol in an alkaline medium. The monomeric products of this type are represented by the general formula

wherein P represents a divalent hydrocarbon radical of the dihydric phenol as

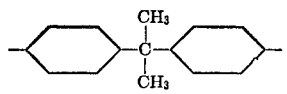

The polymeric products will generally not be a single simple molecule but will be a complex mixture of glycidyl polyethers of the general formula

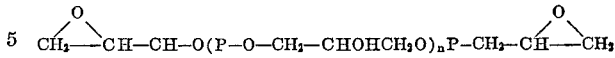

wherein P is a divalent hydrocarbon radical of the dihydric phenol and $n$ is an integer of the series 0.1,2,3 etc. While for any single molecule of the polyether $n$ is an integer, the fact that the obtained polyether is a mixture of compounds causes the determined value for $n$ to be an average which is not necessarily zero or a whole number. The polyethers may, in some cases, contain a very small amount of material with one or both of the terminal glycidyl radicals in hydrated form.

A specific example of a liquid polyepoxide which is useful in the compositions of the present invention is Epon 828, a pourable (160 poises at 25° C.), liquid epoxy resin having a melting point of 8° to 12° C. and an epoxide equivalency of 190 to 210 and is formed by reaction of 4,4'-dihydroxydiphenyl propane and epichlorohydrin in a molar ratio of about 1:2 respectively. Polyepoxides of a mixture of glycerol and epichlorohydrin are useful. Similar polyepoxides may also be used.

The essential constituents of the improved compositions of the present invention are chromium diisopropyl salicylate and stannic chloride. The use of these compounds is necessary in order to obtain the proper reactivity between the hydroxyl-containing copolymer and the epoxy resin. More importantly, the use of these compounds is necessary in order to obtain the desired solvent resistance in the resultant compositions. Based on 100 weight parts of the hydroxyl-containing copolymer, from about 0.02 weight part to about 2.0 weight parts of chromium diisopropyl salicylate and from about 0.02 weight part to about 2.0 weight parts of stannic chloride are sufficient to obtain the improved solvent resistance in the present compositions. It has been found that as little as 0.08 weight part of stannic chloride when employed with 0.5 weight part of chromium diisopropyl salicylate will catalyze the reaction between 10 weight parts of epoxy resin and the hydroxyl-containing vinyl chloride copolymer. In fact, a large variation in weight parts of catalysts are possible in the compositions of the present invention within the ranges given above.

The epoxy resins are readily mixed with the hydroxyl-containing copolymers and the catalysts by conventional techniques. It is preferred, however, to mix the resins, copolymers and catalysts in an organic solvent therefor since then the resultant solution is ready for application as a coating or paint, and the like. Particularly useful solvents are the aliphatic ketones including methyl ethyl ketone, acetone, and the like, and which may also contain aromatic hydrocarbons, such as toluenes, xylenes, and the like. The solutions or compositions contain, based on 100 weight parts of the hydroxyl-containing copolymers, from 2 to 50 parts by weight, preferably 2 to 30 parts by weight, of the epoxy resin.

After application of the coating or composition of the instant invention, the same is dried or heated at temperatures above 100° F., and usually in the range of 200° F. to 400° F. Depending upon the polymers and/or the resins in the composition, the time of heating will normally vary from about 5 minutes to about 30 minutes. It has been found that with most of the compositions, heating the coating for approximately 15 minutes at a temperature of about 300°–400° F. is satisfactory for most all applications. However, in some instances it has been found necessary to bake or heat the coatings for longer periods of time at the same or varying temperatures. For example, a bake cycle of 30 minutes at 212° F., followed by 30 minutes at 300° F. and followed by 15 minutes at 350° F. has been employed. The time and temperature of heating will be dictated, in part, by the hardness and solvent resistance desired or needed in the particular end use.

If desired, small amounts of vinyl chloride polymer plasticizers may be added to the compositions as well as small amounts of pigments. Among the suitable pigments are alumina powder, titanium dioxide, zinc oxide, antimony oxide, chromic oxide, carbon black, red lead, white lead, iron oxide, heavy metal chromates, cadmium yellow and cadmium red, and the like. If desired or needed other pigments, stabilizers, fillers, extenders, and the like may be added.

The following specific examples are given by way of illustration and not limitation. In the examples all parts and percents are by weight unless otherwise indicated.

EXAMPLE I

In this Example a copolymer containing 47% vinyl chloride, 35% vinylidene chloride, 10% hydroxypropyl methacrylate and 8% n-butyl acrylate was prepared by suspension polymerization in an aqueous medium employing methyl cellulose as a dispersant and caprylyl peroxide as a catalyst. The temperature of the polymerization reaction was 60° C. and the reaction was continued for 21 hours with a conversion of 64%. The resultant copolymer had an inherent viscosity of 0.396. This copolymer is designated "A" in Table I below.

For the purpose of comparison, two other known copolymers were prepared and designated as "B," a copolymer of vinyl chloride and vinyl acetate which was then subjected to hydrolysis conditions to give a final content of 87% vinyl chloride, 7% vinyl alcohol and 6% vinyl acetate, and "C," a copolymer of 78.5% vinyl chloride, 18.1% vinyl acetate, 3.0% vinylidene chloride and 2.4% acrylic acid.

A, B, and C were each separately dissolved in methyl ethyl ketone to give 25% total solids solutions. Based on 100 parts of the copolymer, 10 parts of Epon 828 was added along with varying amounts of catalysts chromium diisopropyl salicylate and stannic chloride, as indicated in Table I. Films 0.006 inch thick were cast on aluminum panels with each of the polymeric solutions and then baked 15 minutes at 300° F. Thereafter, the films or coatings were tested for resistance to methyl ethyl ketone (MEK) by keeping the coated surface of the panel wetted with the solvent and rubbing vigorously with a saturated MEK pad. The time necessary to break through the film or coating to expose the metal was noted and recorded. The test results were as follows:

TABLE I

| | 1 | 2 | 3 |
|---|---|---|---|
| Copolymer: | | | |
| A | 100 | | |
| B | | 100 | |
| C | | | 100 |
| Epon 828 | 10 | 10 | 10 |
| Chromium diisopropyl salicylate | 0.5 | 1.0 | 1.0 |
| Stannic chloride | 0.5 | 1.0 | 1.0 |
| MEK resistance | 2¼ min. | 25 sec. | 45 sec. |

It can readily be seen that the copolymer A composition of the present invention is superior in solvent resistance to prior art copolymer compositions. Further, the catalysts used in the instant compositions do not enhance the solvent resistance of prior art compositions.

EXAMPLE II

A copolymer (designated as copolymer "D" in Table II) containing 47% vinyl chloride, 35% vinylidene chloride, 10% hydroxypropyl methacrylate, 5.5% methyl methacrylate and 2.5% n-butyl acrylate was prepared as in Example I and then dissolved in methyl ethyl ketone in an amount to provide a 25% solution of copolymer. Epon 828 was dissolved in separate portions of the copolymer solution along with varying amounts of chromium diisopropyl salicylate and stannic chloride. Films were cast on aluminum panels, as in Example I, and baked for 15 minutes at 350° F. Again, as in Example I, the films were tested for resistance to methyl ethyl ketone (MEK). The results of the tests are tabulated in the following Table II:

TABLE II

| | 4 | 5 | 6 | 7 | 8 | 9 |
|---|---|---|---|---|---|---|
| Copolymer D | 100 | 100 | 100 | 100 | 100 | 100 |
| Epon 828 | 10 | 10 | 10 | 10 | 10 | 10 |
| Chromium diisopropyl salicylate | 0.5 | 0.5 | 0.5 | 0.5 | 0.5 | 0.5 |
| Stannic chloride | 0.08 | 0.09 | 0.10 | 0.15 | 0.2 | 0.3 |
| MEK resistance (minutes) | 2¼ | >5 | 4¾ | 3¼ | 4 | >5 |

This Example illustrates the effect of employing varying amounts of stannic chloride and that as little as 0.08 part of stannic chloride gives good solvent resistance.

EXAMPLE III

In this Example the same copolymer, as described in Example II, was dissolved in methyl ethyl ketone in like manner. The copolymer is designated as copolymer "E" in Table III. Epon 828 was dissolved in separate portions of the copolymer solution along with varying amounts of chromium diisopropyl salicylate and stannic chloride. Films were cast on aluminum panels, as in Example I, and then baked for extended periods at varying temperatures, as shown in Table III. The films were thereafter tested for resistance to methyl ethyl ketone (MEK) as before.

TABLE III

| | 10 | 11 | 12 | 13 |
|---|---|---|---|---|
| Copolymer E | 100 | 100 | 100 | 100 |
| Epon 828 | 10 | 10 | 10 | 10 |
| Chromium diisopropyl salicylate | 0.5 | 0.5 | 0.3 | 0.1 |
| Stannic chloride | 0.5 | 0.1 | 0.5 | 0.5 |
| Panels baked at 212° F. plus 30 min. at 300° F. plus 15 min. at 350° F. | | | | |
| MEK resistance (minutes) | >5 | >5 | 3½ | 2¾ |

EXAMPLE IV

In this Example the same copolymer, as described in Example I, was dissolved in methyl ethyl ketone in like manner, the copolymer being designated "F" in Table IV. Epon 828 was dissolved in two portions of the copolymer solution along with chromium diisopropyl salicylate in one portion and stannic chloride in the other to give a total solids content in each solution of 25%. The purpose of this Example was to show that either catalyst, when used alone, does not give satisfactory solvent resistance. As in the previous Examples, aluminum panels were coated with a 0.06 inch film of each copolymer solution and tested for resistance to methyl ethyl ketone (MEK) with the following results:

| | 14 | 15 |
|---|---|---|
| Copolymer F | 100 | 100 |
| Epon 828 | 10 | 1 |
| Chromium diisopropyl salicylate | 1.0 | |
| Stannic chloride | | 1.0 |
| Panels baked 30 min. at 212° F. plus 15 min. at 300° F. | | |
| MEK resistance (seconds) | 15 | 25 |

Lacquers or coatings made from the compositions of the present invention are particularly useful for solvent resistant inner coatings for metal cans. Further, the compositions described herein form excellent protective coatings in the form of paint compositions for metal articles, particularly in marine and industrial applications. Also, coating compositions of the present invention are useful as recording tape coatings.

Thus, it can be seen that the compositions of the present invention, which are soluble in organic solvents, when prepared as described herein and coated on the desired substrate and heated, are then resistant to the solvents in which they were originally soluble. The usefulness and versatility of such compositions will be readily apparent to those skilled in the art.

Although the invention has been described in terms of its specific embodiments, certain modifications and equivalents will be apparent and are intended to be included 1. A coating composition comprising an organic solvent having dissolved therein (A) a hydroxyl-containing copolymer comprised of (a) from about 40% to about 90% by weight of vinyl chloride, (b) from about 10% to about 60% by weight of vinylidene chloride or vinyl acetate, and (c) from about 2% to about 20% by weight of hydroxypropyl acrylate or hydroxypropyl methacrylate; (B) from 2 to 50 parts by weight, based on 100 weight parts of (A), of a liquid polyepoxide containing a plurality of vicinal epoxy groups and reactive hydroxyl groups; and (C) from about 0.02 part to about 2.0 parts by weight of chromium diisopropyl salicylate and from about 0.02 part to about 2.0 parts by weight of stannic chloride, based on 100 weight parts of (A).

2. A composition as defined in claim 1 wherein (c) is hydroxypropyl acrylate.

3. A composition as defined in claim 1 wherein (c) is hydroxypropyl methacrylate.

4. A composition as defined in claim 1 wherein (A) contains from about 6 to about 10 parts by weight, based on the total weight of the monomers, of an alkyl ester of acrylic acid or methacrylic acid wherein the alkyl group contains from 1 to 4 carbon atoms.

5. A composition as defined in claim 1 wherein the organic solvent is methyl ethyl ketone.

6. A composition as defined in claim 1 wherein the liquid polyepoxide is the reaction product of 4,4'-dihydroxydiphenyl propane or glycerol and epichlorohydrin.

7. A composition as defined in claim 6 wherein the organic solvent is methyl ethyl ketone.

8. A solvent resistant film of claim 1.

9. The composition of claim 1 coated on metal substrate.

10. A method of providing a solvent resistant coating on a metal substrate which comprises depositing from an organic solvent solution on said metal a composition comprising (A) a hydroxyl-containing copolymer comprised of (a) from about 40% to about 90% by weight of vinyl chloride, (b) from about 10% to about 60% by weight of vinylidene chloride or vinyl acetate, and (c) from about 2% to about 20% by weight of hydroxypropyl acrylate or hydroxypropyl methacrylate; (B) from 2 to 50 parts by weight, based on 100 weight parts of (A), of a liquid polyepoxide containing a plurality of vicinal epoxy groups and reactive hydroxyl groups; and (C) from about 0.02 part to about 2.0 parts by weight of chromium diisopropyl salicylate and from about 0.02 part to about 2.0 parts by weight of stannic chloride, based on 100 weight parts of (A), and thereafter heating the resulting coating whereby (B) is reacted with (A).

References Cited

UNITED STATES PATENTS

| | | | |
|---|---|---|---|
| 3,288,883 | 11/1966 | Temin | 260—836 |
| 3,080,341 | 3/1963 | Chenicek | 260—47 EC |

OTHER REFERENCES

Chem. Abst.: 63:10,088a, 1965.

THEODORE MORRIS, Primary Examiner

U.S. Cl. X.R.

260—47 EC, 80.75, 836; 117—132 BE

UNITED STATES PATENT OFFICE
CERTIFICATE OF CORRECTION

PATENT NO. : 3,826,669
DATED : July 30, 1974
INVENTOR(S) : GEORGE J. ANTLFINGER and HAROLD E. VON KAMP It is certified that error appears in the above-identified patent and that said Letters Patent are hereby corrected as shown below:

Column 1, line 41, the date "1872" should read --1972--.

Column 2, line 36, "nitirle" should read --nitrile--.

Column 3, line 5, delete the formula "-C—C" and insert therefor the formula -- -C—C- --; line 16, "polyhydride" should read --polyhydric--.

Column 6, Example IV, in the table, Run 15, "1" should read --10--.

Signed and Sealed this twenty-ninth Day of July 1975

[SEAL]

Attest:

RUTH C. MASON
Attesting Officer

C. MARSHALL DANN
Commissioner of Patents and Trademarks